United States Patent
Quinn

(10) Patent No.: US 11,237,138 B2
(45) Date of Patent: Feb. 1, 2022

(54) SELECTION AND DESIGN OF COLUMNS FOR LIQUID CHROMATOGRAPHY

(71) Applicant: Hubert M. Quinn, Boston, MA (US)

(72) Inventor: Hubert M. Quinn, Boston, MA (US)

(73) Assignee: THE WRANGLER GROUP, Boston, MA (US)

( * ) Notice: Subject to any disclaimer, the term of this patent is extended or adjusted under 35 U.S.C. 154(b) by 80 days.

(21) Appl. No.: 16/446,356

(22) Filed: Jun. 19, 2019

(65) Prior Publication Data

US 2020/0400625 A1    Dec. 24, 2020

(51) Int. Cl.
| | | |
|---|---|---|
| *B01D 15/16* | (2006.01) | |
| *G01N 30/60* | (2006.01) | |
| *G01N 30/86* | (2006.01) | |
| *G01N 30/02* | (2006.01) | |
| *G01N 30/32* | (2006.01) | |
| *G01N 30/52* | (2006.01) | |
| *G01N 30/56* | (2006.01) | |

(52) U.S. Cl.
CPC ....... *G01N 30/6065* (2013.01); *B01D 15/163* (2013.01); *G01N 30/6052* (2013.01); *G01N 30/8658* (2013.01); *G01N 2030/027* (2013.01); *G01N 2030/324* (2013.01); *G01N 2030/524* (2013.01); *G01N 2030/562* (2013.01)

(58) Field of Classification Search
CPC ......... G01N 30/6065; G01N 2030/027; G01N 2030/324; G01N 2030/524; G01N 2030/562; G01N 30/6052; G01N 30/8658; B01D 15/163
See application file for complete search history.

(56) References Cited

U.S. PATENT DOCUMENTS

| | | |
|---|---|---|
| 2008/0264865 A1 | 10/2008 | Herman |
| 2010/0086443 A1 | 4/2010 | Neyer |
| 2013/0248700 A1 | 9/2013 | Benevides et al. |
| 2014/0138312 A1* | 5/2014 | Bunner ............ G01N 30/6086 210/635 |
| 2015/0219604 A1* | 8/2015 | Ritchie ............ B01J 20/28052 73/61.53 |
| 2017/0197156 A1* | 7/2017 | Armstrong ............ B01J 20/22 |
| 2018/0128789 A1 | 5/2018 | Hollnagel et al. |

OTHER PUBLICATIONS

Waters, "Column dimension & related HPLC parameters", Waters Corporation. (Year: 2003).*
De Villiers, A. et al., "Influence of frictional heating on temperature gradients in ultra-high-pressure liquid chromatography on 2.1 mm I.D. columns", Journal of Chromatography A, 1113, pp. 84-91. (Year: 2006).*
Seton Hall University, "Band broadening theory (Van Deemter equation)". Internet Archive. Jul. 6, 2017.*
"Experimental Evidence of the Kinetic Performance achievable with Columns Packed with New 1.9 µm fully Porous Particles of Narrow Particle Size Distribution", Journal of Chromatography A, 1454 (2016) 86-92.

* cited by examiner

*Primary Examiner* — Benjamin L Lebron
(74) *Attorney, Agent, or Firm* — Grossman, Tucker, Perrault & Pfleger, PLLC

(57) ABSTRACT

The present disclosure is directed at the selection and design of columns for liquid chromatography including liquid chromatography devices and systems and corresponding methods of operation, particularly in the field of high pressure liquid chromatography (HPLC).

15 Claims, 11 Drawing Sheets

| Table 1 | | | | | | | | | | | |
|---|---|---|---|---|---|---|---|---|---|---|---|
| $d_p$ (micron) | 1.00 | 1.10 | 1.20 | 1.30 | 1.40 | 1.50 | 1.60 | 1.70 | 1.80 | 1.90 | 2.00 |
| $y = \Delta P$ (bar) | 125.94x | 94.613x | 72.875x | 57.318x | 45.892x | 37.312x | 30.744x | 25.63x | 21.592x | 18.359x | 15.741x |
| x = L (cm) | | | | | | | | | | | |
| 1. | 126 | 95 | 73 | 57 | 46 | 37 | 31 | 26 | 22 | 18 | 16 |
| 2. | 252 | 189 | 146 | 115 | 92 | 75 | 61 | 51 | 43 | 37 | 31 |
| 3. | 378 | 284 | 219 | 172 | 138 | 112 | 92 | 77 | 65 | 55 | 47 |
| 4. | 504 | 378 | 292 | 229 | 184 | 149 | 123 | 103 | 86 | 73 | 63 |
| 5. | 630 | 473 | 364 | 287 | 229 | 187 | 154 | 128 | 108 | 92 | 79 |
| 6. | 756 | 568 | 437 | 344 | 275 | 224 | 184 | 154 | 130 | 110 | 94 |
| 7. | 882 | 662 | 510 | 401 | 321 | 261 | 215 | 179 | 151 | 129 | 110 |
| 8. | 1,008 | 757 | 583 | 459 | 367 | 298 | 246 | 205 | 173 | 147 | 126 |
| 9. | 1,133 | 852 | 656 | 516 | 413 | 336 | 277 | 231 | 194 | 165 | 142 |
| 10. | 1,259 | 946 | 729 | 573 | 459 | 373 | 307 | 256 | 216 | 184 | 157 |
| 11. | 1,385 | 1,041 | 802 | 630 | 505 | 410 | 338 | 282 | 238 | 202 | 173 |
| 12. | | 1,135 | 875 | 688 | 551 | 448 | 369 | 308 | 259 | 220 | 189 |
| 13. | | 1,230 | 947 | 745 | 597 | 485 | 400 | 333 | 281 | 239 | 205 |
| 14. | | 1,325 | 1,020 | 802 | 642 | 522 | 430 | 359 | 302 | 257 | 220 |
| 15. | | | 1,093 | 860 | 688 | 560 | 461 | 384 | 324 | 275 | 236 |
| 16. | | | 1,166 | 917 | 734 | 597 | 492 | 410 | 345 | 294 | 252 |
| 17. | | | 1,239 | 974 | 780 | 634 | 523 | 436 | 367 | 312 | 268 |
| 18. | | | 1,312 | 1,032 | 826 | 672 | 553 | 461 | 389 | 330 | 283 |
| 19. | | | | 1,089 | 872 | 709 | 584 | 487 | 410 | 349 | 299 |
| 20. | | | | 1,146 | 918 | 746 | 615 | 513 | 432 | 367 | 315 |

FIG. 3

Table 2

| $d_p$ (micron) | 1.00 | 1.10 | 1.20 | 1.30 | 1.40 | 1.50 | 1.60 | 1.70 | 1.80 | 1.90 | 2.00 |
|---|---|---|---|---|---|---|---|---|---|---|---|
| Y = N (pl/col) | 2377.3x | 2161.2x | 1981.1x | 1828.7x | 1698.1x | 1584.9x | 1485.8x | 1398.4x | 1320.7x | 1251.2x | 1188.7x |
| x = L (cm) | | | | | | | | | | | |
| 1. | 2,377 | 2,161 | 1,981 | 1,829 | 1,698 | 1,585 | 1,486 | 1,398 | 1,321 | 1,251 | 1,189 |
| 2. | 4,755 | 4,322 | 3,962 | 3,657 | 3,397 | 3,170 | 2,972 | 2,797 | 2,641 | 2,502 | 2,377 |
| 3. | 7,132 | 6,484 | 5,943 | 5,486 | 5,095 | 4,755 | 4,457 | 4,195 | 3,962 | 3,754 | 3,566 |
| 4. | 9,509 | 8,645 | 7,924 | 7,315 | 6,794 | 6,340 | 5,943 | 5,594 | 5,283 | 5,005 | 4,755 |
| 5. | 11,887 | 10,806 | 9,906 | 9,144 | 8,492 | 7,925 | 7,429 | 6,992 | 6,604 | 6,256 | 5,944 |
| 6. | 14,264 | 12,967 | 11,887 | 10,972 | 10,190 | 9,509 | 8,915 | 8,390 | 7,924 | 7,507 | 7,132 |
| 7. | 16,641 | 15,128 | 13,868 | 12,801 | 11,889 | 11,094 | 10,401 | 9,789 | 9,245 | 8,758 | 8,321 |
| 8. | 19,018 | 17,290 | 15,849 | 14,630 | 13,587 | 12,679 | 11,886 | 11,187 | 10,566 | 10,010 | 9,510 |
| 9. | 21,396 | 19,451 | 17,830 | 16,458 | 15,286 | 14,264 | 13,372 | 12,586 | 11,886 | 11,261 | 10,696 |
| 10. | 23,773 | 21,612 | 19,811 | 18,287 | 16,984 | 15,849 | 14,858 | 13,984 | 13,207 | 12,512 | 11,887 |
| 11. | 26,150 | 23,773 | 21,792 | 20,116 | 18,682 | 17,434 | 16,344 | 15,382 | 14,528 | 13,763 | 13,076 |
| 12. | | 25,934 | 23,773 | 21,944 | 20,381 | 19,019 | 17,830 | 16,781 | 15,848 | 15,014 | 14,264 |
| 13. | | 28,096 | 25,754 | 23,773 | 22,079 | 20,604 | 19,315 | 18,179 | 17,169 | 16,266 | 15,453 |
| 14. | | 30,257 | 27,735 | 25,602 | 23,778 | 22,189 | 20,801 | 19,578 | 18,490 | 17,517 | 16,642 |
| 15. | | | 29,717 | 27,431 | 25,476 | 23,774 | 22,287 | 20,976 | 19,811 | 18,768 | 17,831 |
| 16. | | | 31,698 | 29,259 | 27,174 | 25,358 | 23,773 | 22,374 | 21,131 | 20,019 | 19,019 |
| 17. | | | 33,679 | 31,088 | 28,873 | 26,943 | 25,259 | 23,773 | 22,452 | 21,270 | 20,208 |
| 18. | | | | 32,917 | 30,571 | 28,528 | 26,744 | 25,171 | 23,773 | 22,522 | 21,397 |
| 19. | | | | 34,745 | 32,270 | 30,113 | 28,230 | 26,570 | 25,093 | 23,773 | 22,585 |
| 20. | | | | 36,574 | 33,968 | 31,698 | 29,716 | 27,968 | 26,414 | 25,024 | 23,774 |

FIG. 5

| Table 3 | | | | | | | | | | | |
|---|---|---|---|---|---|---|---|---|---|---|---|
| $d_p$ (micron) | 1.00 | 1.10 | 1.20 | 1.30 | 1.40 | 1.50 | 1.60 | 1.70 | 1.80 | 1.90 | 2.00 |
| $y = S_0$ [(pl/col)bar] | 58.272x | 43.781x | 33.722x | 26.254x | 21.236x | 17.266x | 14.227x | 11.861x | 9.9918x | 8.4957x | 7.284x |
| $x = L$ (cm) | | | | | | | | | | | |
| 1. | 58 | 44 | 34 | 27 | 21 | 17 | 14 | 12 | 10 | 8 | 7 |
| 2. | 466 | 350 | 270 | 212 | 170 | 138 | 114 | 95 | 80 | 68 | 58 |
| 3. | 1,573 | 1,182 | 910 | 716 | 573 | 466 | 384 | 320 | 270 | 229 | 197 |
| 4. | 3,729 | 2,802 | 2,158 | 1,698 | 1,359 | 1,105 | 911 | 759 | 639 | 544 | 466 |
| 5. | 7,284 | 5,473 | 4,215 | 3,316 | 2,655 | 2,158 | 1,778 | 1,483 | 1,249 | 1,062 | 911 |
| 6. | 12,587 | 9,457 | 7,284 | 5,729 | 4,587 | 3,729 | 3,073 | 2,562 | 2,158 | 1,835 | 1,573 |
| 7. | 19,987 | 15,017 | 11,567 | 9,098 | 7,284 | 5,922 | 4,880 | 4,068 | 3,427 | 2,914 | 2,498 |
| 8. | 29,835 | 22,416 | 17,266 | 13,580 | 10,873 | 8,840 | 7,284 | 6,073 | 5,116 | 4,350 | 3,729 |
| 9. | 42,480 | 31,916 | 24,583 | 19,336 | 15,481 | 12,587 | 10,371 | 8,647 | 7,284 | 6,193 | 5,310 |
| 10. | 58,272 | 43,781 | 33,722 | 26,524 | 21,236 | 17,266 | 14,227 | 11,861 | 9,992 | 8,496 | 7,284 |
| 11. | 77,560 | 58,273 | 44,884 | 35,303 | 28,265 | 22,981 | 18,936 | 15,787 | 13,299 | 11,308 | 9,695 |
| 12. | | 75,654 | 58,272 | 45,833 | 36,696 | 29,836 | 24,584 | 20,496 | 17,266 | 14,681 | 12,587 |
| 13. | | 96,187 | 74,087 | 58,273 | 46,655 | 37,933 | 31,257 | 26,059 | 21,952 | 18,665 | 16,003 |
| 14. | | 120,135 | 92,533 | 72,782 | 58,272 | 47,378 | 39,039 | 32,547 | 27,417 | 23,312 | 19,987 |
| 15. | | | 113,812 | 89,519 | 71,672 | 58,273 | 48,016 | 40,031 | 33,722 | 28,673 | 24,854 |
| 16. | | | 138,125 | 108,642 | 86,983 | 70,722 | 58,274 | 48,583 | 40,926 | 34,798 | 29,835 |
| 17. | | | 165,676 | 130,312 | 104,332 | 84,828 | 69,897 | 58,273 | 49,090 | 41,739 | 35,786 |
| 18. | | | | 154,688 | 123,848 | 100,695 | 82,972 | 69,173 | 58,272 | 49,547 | 42,480 |
| 19. | | | | 181,928 | 145,658 | 118,427 | 97,583 | 81,355 | 68,534 | 58,272 | 49,961 |
| 20. | | | | 212,192 | 169,888 | 138,128 | 113,816 | 94,888 | 79,934 | 67,966 | 58,272 |

FIG. 7

| Table 4 | | | | | | | | | | | |
|---|---|---|---|---|---|---|---|---|---|---|---|
| $d_P$ (micron) | 1.00 | 1.10 | 1.20 | 1.30 | 1.40 | 1.50 | 1.60 | 1.70 | 1.80 | 1.90 | 2.00 |
| $y = t_Q$ (sec) | 0.186x | 0.2046x | 0.2232x | 0.2418x | .2604x | 0.279x | 0.2796x | 0.3162x | 0.3348x | 0.3534x | 0.372x |
| $x = L$ (cm) | | | | | | | | | | | |
| 1. | 0.19 | 0.20 | 0.22 | 0.24 | 0.26 | 0.28 | 0.30 | 0.32 | 0.33 | 0.35 | 0.37 |
| 2. | 0.37 | 0.41 | 0.45 | 0.48 | 0.52 | 0.56 | 0.60 | 0.63 | 0.67 | 0.71 | 0.74 |
| 3. | 0.56 | 0.61 | 0.67 | 0.73 | 0.78 | 0.84 | 0.89 | 0.95 | 1.00 | 1.06 | 1.12 |
| 4. | 0.74 | 0.82 | 0.89 | 0.97 | 1.04 | 1.12 | 1.19 | 1.26 | 1.34 | 1.41 | 1.49 |
| 5. | 0.93 | 1.02 | 1.12 | 1.21 | 1.30 | 1.40 | 1.49 | 1.58 | 1.67 | 1.77 | 1.86 |
| 6. | 1.12 | 1.23 | 1.34 | 1.45 | 1.56 | 1.67 | 1.79 | 1.90 | 2.01 | 2.12 | 2.23 |
| 7. | 1.30 | 1.43 | 1.56 | 1.69 | 1.82 | 1.95 | 2.08 | 2.21 | 2.34 | 2.47 | 2.60 |
| 8. | 1.49 | 1.64 | 1.79 | 1.93 | 2.08 | 2.23 | 2.38 | 2.53 | 2.68 | 2.83 | 2.98 |
| 9. | 1.67 | 1.84 | 2.01 | 2.18 | 2.34 | 2.51 | 2.68 | 2.85 | 3.01 | 3.18 | 3.35 |
| 10. | 1.86 | 2.05 | 2.23 | 2.42 | 2.60 | 2.79 | 2.98 | 3.16 | 3.35 | 3.53 | 3.72 |
| 11. | 2.05 | 2.25 | 2.46 | 2.66 | 2.86 | 3.07 | 3.27 | 3.48 | 3.68 | 3.89 | 4.09 |
| 12. | | 2.46 | 2.68 | 2.90 | 3.12 | 3.35 | 3.57 | 3.79 | 4.02 | 4.24 | 4.46 |
| 13. | | 2.66 | 2.90 | 3.14 | 3.39 | 3.63 | 3.87 | 4.11 | 4.35 | 4.59 | 4.84 |
| 14. | | 2.86 | 3.12 | 3.39 | 3.65 | 3.91 | 4.17 | 4.43 | 4.69 | 4.95 | 5.21 |
| 15. | | | 3.35 | 3.63 | 3.91 | 4.19 | 4.46 | 4.74 | 5.02 | 5.30 | 5.58 |
| 16. | | | 3.57 | 3.87 | 4.17 | 4.46 | 4.76 | 5.06 | 5.36 | 5.65 | 5.95 |
| 17. | | | 3.79 | 4.11 | 4.43 | 4.74 | 5.06 | 5.38 | 5.69 | 6.01 | 6.32 |
| 18. | | | | 4.35 | 4.69 | 5.02 | 5.36 | 5.69 | 6.03 | 6.36 | 6.70 |
| 19. | | | | 4.59 | 4.95 | 5.30 | 5.65 | 6.01 | 6.36 | 6.71 | 7.07 |
| 20. | | | | 4.84 | 5.21 | 5.58 | 5.95 | 6.32 | 6.70 | 7.07 | 7.44 |

*FIG. 9*

SELECTION AND DESIGN OF COLUMNS FOR LIQUID CHROMATOGRAPHY

FIELD

The present disclosure is directed at the selection and design of columns for liquid chromatography including liquid chromatography devices and systems and corresponding methods of operation, particularly in the field of high pressure liquid chromatography (HPLC).

BACKGROUND

The utility of separations by liquid chromatography has been demonstrated over a relatively broad range of applications including the analysis and purification of molecules at varying molecular weights. In liquid chromatography, as in gas chromatography, there are also established limitations arising out of the time and efficiency required for analysis and the characteristics of the columns that have been proposed and employed.

The separation process generally relies on the feature that component solute molecules in a flowing stream of a fluid are percolated through a packed bed of particles, known as the stationary phase, can be efficiently separated from one another. The individual sample components are separated because each component has a different affinity for the stationary phase, leading to a different rate of migration for each component and a different exit time for each component emerging from the column. The separation efficiency is determined by the amount of spreading of the solute band as it traverses the bed or column.

A relative long history of literature references in the scientific community has made repeated attempts to model, understand and quantify the relationship between fluid flow in closed conduits such as chromatography columns. Such models include an accompanying array of theoretical equations to empirically define the variables that influence efficiency and resolution, yet the scientific literature confirms the inadequacy of these theories given various experimental reports that still—to this day—struggle to resolve the various discrepancies which exist in these efforts to model chromatography fluid dynamics.

Accordingly, a need exists to more accurately identify the factors that influence fluid flow dynamics applicable to the field of liquid chromatography, which would then provide more reliable protocols for the design and selection of columns containing packed particles. This then would lead to more efficient methods of operation of chromatography systems and devices. Such improved methods of operation would also include enhanced resolution of injected samples containing targeted molecules for detection and isolation, which of course is a main underlying and universal goal of chromatography analysis.

SUMMARY

A method performed in a liquid chromatography apparatus comprising providing a packed column containing particles having a diameter of about 1.0 µm to 2.0 µm, the column having an internal diameter of about 0.15 cm to 0.20 cm and a column length of about 1 cm to 20 cm and eluting a fluid through the column wherein the column indicates a maximum pressure drop of 1300 bar.

A method for isolating a target molecule comprising providing a packed column containing particles having a diameter of about 1.0 µm to 2.0 µm, the column having an internal diameter of about 0.15 cm to 0.20 cm and a column length of about 1 cm to 20 cm, followed by eluting a fluid through the column comprising the target molecule wherein the column indicates a maximum pressure drop of 1300 bar and recovering portions of the liquid comprising the target molecule.

A liquid chromatography system comprising a packed column containing particles having a diameter of about 1.0 µm to 2.0 µm, the column having an internal diameter of about 0.15 cm to 0.20 cm and a column length of about 1 cm to 20 cm, wherein eluting a fluid through the column indicates a maximum pressure drop of 1300 bar.

BRIEF DESCRIPTION OF THE DRAWINGS

FIG. 3 provides Table 1 identifying for $d_p$ values of 1.0 µm to 2.0 µm, and for column length L, the value of pressure drops ΔP in units of bar.

FIG. 5 provides Table 2 identifying for $d_p$ values of 1.0 µm to 2.0 µm, and for column length L, the value of N (number of plates per column or pl/col).

FIG. 7 provides Table 3 identifying for $d_p$ values of 1.0 µm to 2.0 µm, and for column length L, the value of $S_Q$ (number of plates per column bar).

FIG. 9 provides Table 4 identifying for $d_p$ values of 1.0 µm to 2.0 µm, and for column length L, the value of $t_Q$.

DETAILED DESCRIPTION

Figure 1:
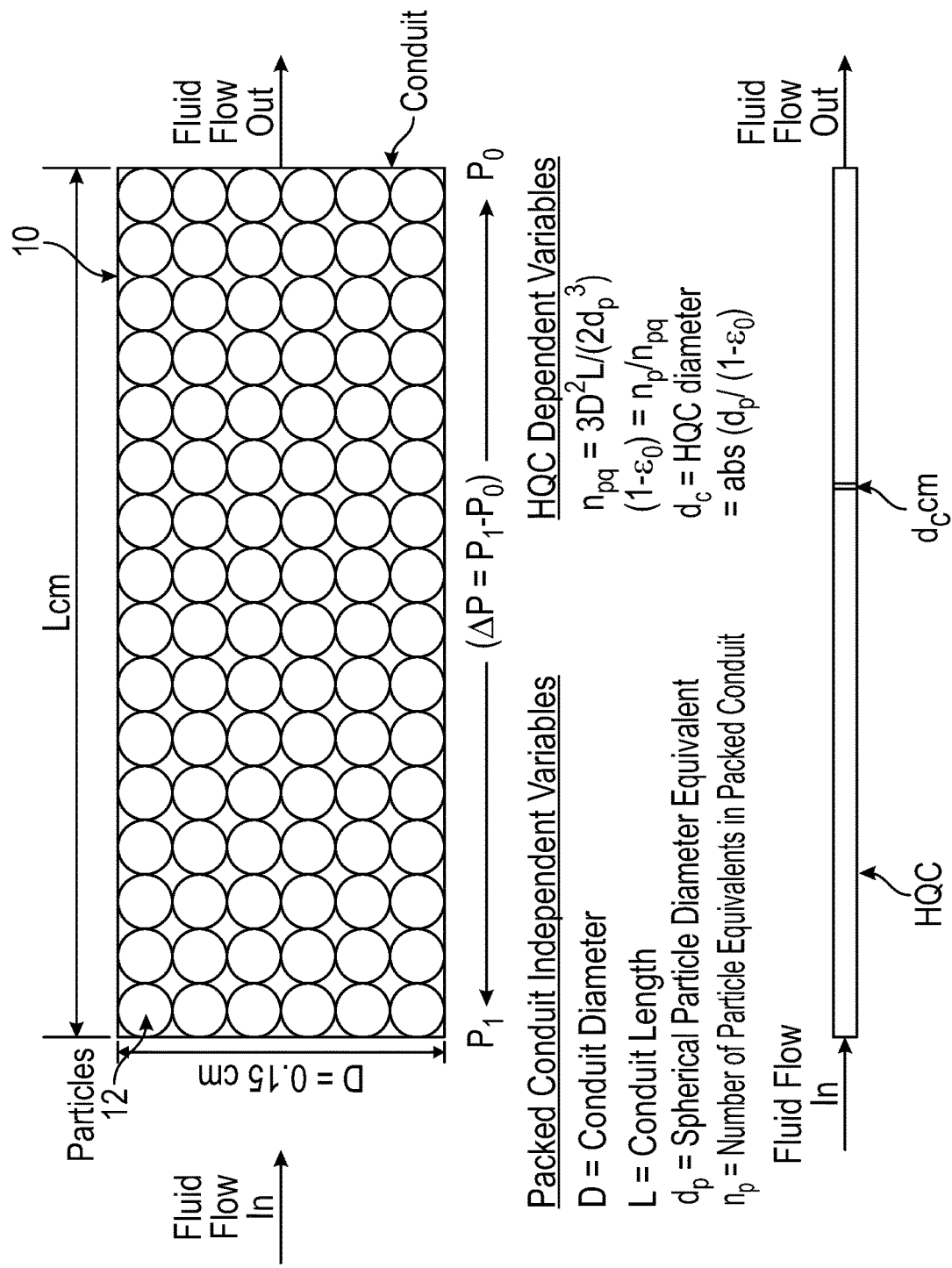
FIG. 1 is a schematic showing a portion of a conduit containing the indicated particles.

Reference is made to FIG. 1 which shows a portion of a conduit 10 containing the indicated particles 12. Such conduit may therefore be a portion of a liquid chromatography (LC) column, which is understood as containing absorbent particles within an enclosure. The particles 10 thereby preferably define the stationery phase of the chromatography system and are preferably pellicular, which is reference to the feature that the particles include an outer layer of porous material that surrounds an inner nonporous core. However, in order to increase the active surface area, the particles can be porous throughout from the outer diameter through to the central core of the particle. Particles can be preferably made from polymers or glass beads or inorganic substrates. The particles may preferably be sourced from silica, polystyrene-divinyl-benzene synthetic resin, alumina or other types of neutral or ion-exchange resin stationary phases.

As illustrated in FIG. 1, the particles are preferably packed and distributed to form what is identified as a hypothetical Q channel (HQC) of the column to provide that voids, i.e. empty pockets of free space are minimized or avoided. Evenly distributed particles throughout the column is preferred to produce an efficient column and excludes the possibility of "partially filled" columns. By evenly distributed it is understood that the packed density of the particles is relatively homogenous throughout the packed column and preferably the interstitial voids are relatively uniform and more preferably reduced to a minimum. This packing arrangement of the particles yields typical values for $\varepsilon_0$ greater than about 0.40, where $\varepsilon_0$ is the volume fraction of the packed conduit external to the particles.

As can be seen from the variables/equations now identified in FIG. 1, a discussion now follows defining e.g., column and particle characteristics, fluid flow, and pressure drops. However, to be clear, while fluid flow behavior through a column is now reduced to theoretical relationships according to the various equations identified herein, the current disclosure is ultimately directed at liquid chromatography columns and devices and associated methods of operation, particularly in the field of HPLC. Therefore, while the presentation of various theoretical equations influencing fluid flow are identified herein, and while such equations were useful in selecting, e.g, the column characteristics for chromatography separation herein, such theoretical equations are not to be considered as somehow binding or limiting on the practical results herein, which are HPLC systems having, among other things, improved separation efficiency and a reduction and minimization in analysis time.

To start then, the variables describing the column can be identified as follows:

$$d_c = abs(d_p/(1-\varepsilon_0))$$

where $d_c$=the diameter of the hypothetical Q Channel and $d_p$ is the spherical particle diameter equivalent and given by the expression $d_p = d_{pm}\Omega_p$, where $d_{pm}$ is the nominal diameter of the particle and $\Omega_p$ refers to the particle sphericity, where $\Omega_p \leq 1$; thus, when $\Omega_p = 1$, the particle is spherical. Sphericity is the degree to which a particle shape deviates from that of a perfect sphere, wherein a sphericity of unity denotes a perfect sphere and values of sphericity less than unity denotes irregular (non-circular) particle shapes. The term $\varepsilon_0$ as noted is the volume fraction of the packed conduit external to the particles and $(1-\varepsilon_0)$ is the volume fraction of the packed conduit occupied by the particles and given by the expression:

$$(1-\varepsilon_0) = n_p/n_{pq}$$

where $n_p$=the number of particle equivalents in the column with diameter values of $d_p$ and $n_{pq}$ is the number of particle equivalents whose collective volume is equal to the free space within the conduit and given by the expression:

$$n_{pq} = 3D^2L/(2d_p^3)$$

where D=the internal diameter of the conduit; L=the length of the conduit. Accordingly, for a given packed column, $n_p$ is identified as the volume of the empty conduit divided by the volume of $d_p$ for the particles packed into that column, and has a unique value for any given packed column.

When fluid is pumped through the column under a hydraulic pressure $P_1$ at the column inlet and a hydraulic pressure of $P_0$ at the column outlet, the differential pressure gradient per unit column length through the column is now represented as:

$$\Delta P/L = (P_1 - P_0)/L$$

where $\Delta P$=the column pressure drop.

We next define the column efficiency expressed in units of plates per column N as:

$$N = L/(hd_p)$$

where h=a dimensionless parameter with a value typically less than 10. The value of h may therefore range from 0.1 to 10.

We define herein $S_0$, the dimensionless column/solute separation factor as:

$$S_0 = t_Q D_M/A$$

where $D_M$=the diffusion coefficient of the solute in the mobile phase and A=the column cross sectional area and is, in turn, defined as:

$$A = \pi D^2/4$$

where $t_Q$=the column hydrodynamic time constant and, in turn, is defined as:

$$t_Q = \delta \varepsilon_t L d_c \rho_f/\eta$$

where $\delta$=the column porosity normalization coefficient and, in turn, is defined as:

$$\delta = 1/\varepsilon_0^3$$

where $\varepsilon_t$=the column total porosity and, in turn, is defined as:

$$\varepsilon_t = 1 - (1-\varepsilon_p)n_p/n_{pq}$$

where $\varepsilon_p$ is the particle porosity and, in turn, is defined as:

$$\varepsilon_p = S_{pv}/\rho_{part}$$

where $S_{pv}$=the particle specific pore volume, an independent property of the particle and where $\rho_{part}$=the particle apparent density and, in turn, is defined as:

$$\rho_{part} = m_{dp}/v_{dp}$$

where $m_{dp}$=the mass of the particle, an independent property of the particle; $v_{dp}$=the volume of the particle and, in turn, is defined as:

$$v_{dp} = \pi d_p^3/6$$

where $\eta$=the fluid absolute viscosity; $\rho_f$=the fluid density.

Next we define the efficiency normalized column/solute separation factor as:

$$S_N = NS_0$$

where N=the column efficiency and is, in turn, defined as:

$$N = L/(hd_c)$$

where h=the reduced plate height as taught by Giddings. See, J. C. Giddings, *Unified Separation Science*, Wiley, New York, N.Y., USA, 1991, page 277 equation (12.25).

Next we define the efficiency/pressure normalized column/solute separation factor as:

$$S_Q = S_N \Delta P$$

Figure 2:
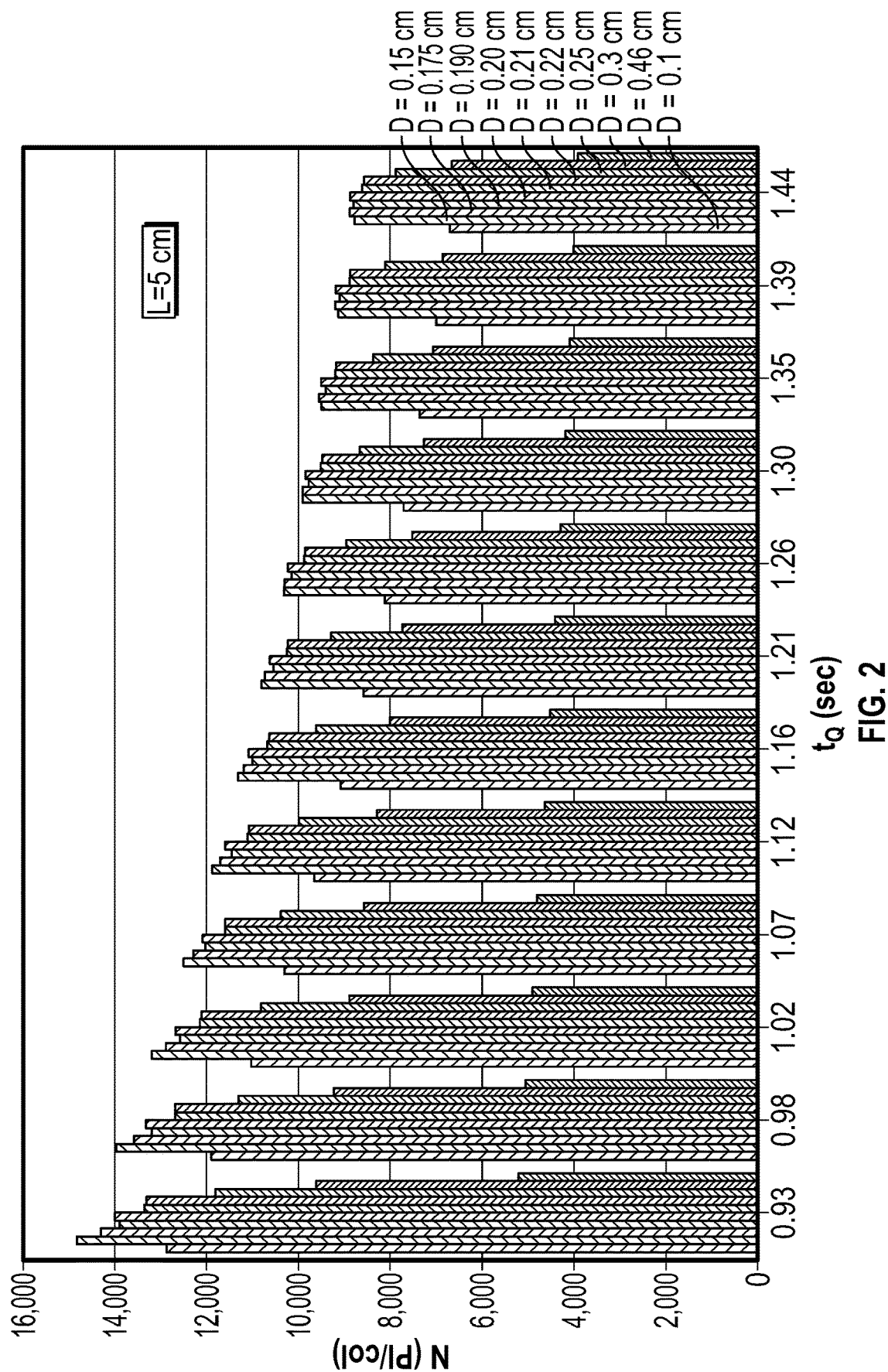
FIG. 2 provides a plot of column efficiency N in units of plates per column versus the Q thermodynamic time constant $t_Q$ in units of seconds for a conduit length of L=5 cm at a range of diameters D ranging from 0.1 cm to 0.46 cm.

FIG. 2, provides a plot of column efficiency N, in units of plates per column (pl/col) versus the Q thermodynamic time constant $t_Q$, in units of seconds, for a conduit length of L=5 cm at a range of conduit diameters "D" ranging from 0.1 cm to 0.46 cm. With regards to the parameter $t_Q$ and its meaning in the context of fluid dynamics within the packed column, the following is noted:

$$t_Q = t_0 \times Q_N$$

where $t_0 = \pi D^2 L \varepsilon_t/(4q)$ is the time it takes to displace one column volume and where q=the volumetric flow rate of the mobile phase through the column, where $Q_N = \delta R_{em}$ is a dimensionless time factor relating to the fluid dynamic behavior of the flowing fluid and where $R_{em}$ is the modified Reynolds number as defined by Ergun et al and is expressed as $R_{em}=\mu_s d_c \rho_f/\eta$ (see, S. Ergun and A. A. Orning, "*Fluid Flow Through Randomly Packed Columns and Fluidized Beds*," Industrial & Engineering Chemistry, vol. 4, no. 6, pp. 1179-1184, 1949) and where $\mu_s$, in turn, is the superficial linear velocity through the column and may be expressed as, $\mu_s=4q/(\pi D^2)$ and where $d_c=d_p/(1-\varepsilon_0)$ and $\eta$=the viscosity of the mobile phase and $\rho_f$=the density of the mobile phase.

Alternatively, in the context of fluid dynamics therefore, $t_Q$ may be thought of as the wall friction damping coefficient and $Q_N$ as the fluid friction damping coefficient. It should be appreciated that fluid motion is therefore damped in two ways, namely by wall friction and by fluid friction. Accordingly, one may write:

$$t_Q = \frac{\delta L d_c \varepsilon_t}{v}$$

$v$ is defined as the kinematic viscosity and is equal to $\eta/\rho_f$.

As shown in the plot, maximum efficiency is achieved with a column internal diameter D=0.15 cm. However, in the broad context of the present disclosure, such column diameters may range from about 0.15 cm to 0.20 cm, or from about 0.15 cm to 0.19 cm, or from about 0.15 cm to 0.18 cm, or from about 0.15 cm to 0.17 cm, or from about 0.15 cm to 0.16 cm. Column diameters may also preferably be about 0.15 cm, or about 0.16 cm, or about 0.17 cm, or about 0.18 cm, or about 0.19 cm, or about 0.20 cm. Reference to the column diameter having a value of "about" followed by a recited dimension may be understood that the recited diameter may vary+/−0.01 cm.

Figure 4:
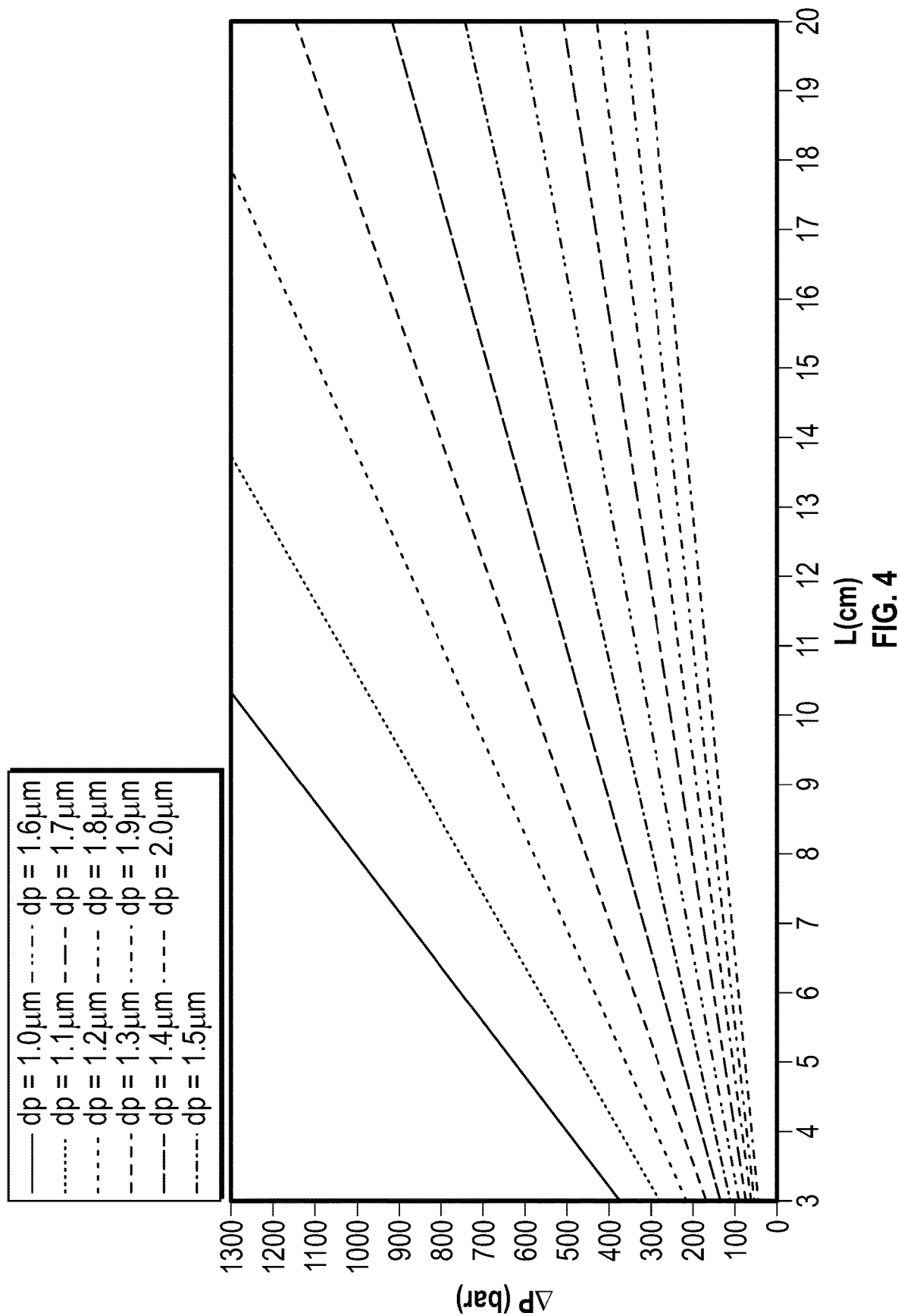
FIG. 4 provides a graphical representation of ΔP in units of bar versus column length L at different values of $d_p$.

Reference is now made to Table 1 in FIG. 3 and its graphical representation in FIG. 4. As can therefore now be observed, using the preferred column diameter of D=0.15 cm, a plot of pressure drop ΔP in units of bar, versus a column length L in centimeters (cm) is provided in FIG. 4, at different $d_p$ values from 1.0 μm to 2.0 μm, where the representative mobile phase is water, although other mobile phases may be employed. As can be seen, column length may vary between about 1 cm to about 20 cm, which means for a given length in such range that may be employed, such as 1 cm, the length may be 1 cm and +/−0.1 cm. Accordingly, at the high end of this range, one may select a column having a length of about 20 cm, which means a column that has length of 20 cm and +/−0.1 cm. The value of $d_p$ or particle diameter is ≤2.0 μm, or more preferably about 1.0 μm to 2.0 μm, which means for any given particle diameter selected in such range, the diameter may vary+/−0.05 μm. The value of ΔP, in units of bar for such column parameters (particle diameter, column internal diameter and column length) is preferably at or below a maximum of 1300 bar, or at or below a maximum of 1200 bar, or at or below a maximum of 1100 bar, or at or below a maximum of 1000 bar, or at or below a maximum of 900 bar, or at or below a maximum of 800 bar, or at or below a maximum of 700 bar, or at or below a maximum of 600 bar, or at or below a maximum of 500 bar, or at or below a maximum of 400 bar, or at or below a maximum of 300 bar, or at or below a maximum of 200 bar, or at or below a maximum of 100 bar, or at or below a maximum of 50 bar, or at or below a maximum of 25 bar. Accordingly, the maximum value of ΔP herein may be in the range of 25 bar to 1300 bar. See again, FIG. 3 and Table 1.

Pressure drop values pertaining to packed columns in this application specifically excludes all sources of pressure other than the packed bed. For instance, the pressure drop caused by the column end frits (retainers) and any other system components are excluded. The preferred method herein to measure pressure drop is to position a calibrated pressure transducer, as well known in the art, at the packed column inlet and record the gauge pressure for each flow rate of the mobile phase under study, making sure that the outlet of the packed column under study is open to the atmosphere (atmospheric pressure). To account for the pressure drop across the end frits, an empty column with comparable end frits is measured under identical conditions and the pressure drop of the frits, if any, is subtracted from that measured in the packed column.

As can now be appreciated, one may now provide a ΔP value of at or below 1300 bar for the following columns having diameters of about 0.15 cm to 0.20 cm: (1) particle diameter of about 1.0 μm at column length of about 1 cm to 10 cm; (2) particle diameter of about 1.10 μm at column lengths of about 1.0 cm to 13.0 cm; (3) particle diameter of about 1.20 μm at column lengths of about 1.0 cm to 17.0 cm; (4) particle diameter of about 1.30 μm at column lengths of about 1.0 cm to 20 cm; (5) particle diameter of about 1.40 μm at column lengths of about 1.0 cm to 20 cm; (6) particle diameter of about 1.50 μm at column lengths of about 1.0 cm to 20 cm; (7) particle diameter of about 1.60 μm at column lengths of about 1.0 cm to 20 cm; (8) particle diameter of about 1.70 μm at column lengths of about 1.0 cm to 20 cm; (9) particle diameter of about 1.80 μm at column lengths of about 1.0 cm to 20 cm; (9) particle diameter at about 1.90 μm at column lengths of about 1.0 cm to 20 cm; (10) particle diameter at about 2.0 μm at column lengths of about 1.0 cm to 20 cm. As alluded to above, reference to the foregoing particle diameters as having a diameter of "about" followed by a recited dimension may be understood as referring to the feature that the particle diameter may vary+/−0.05 μm. By way of example therefore, selection and use of a particle diameter of about 1.0 μm herein may be understood as a particle diameter of 1.0 μm with a variation of +/−0.05 μm.

In addition, it is worth noting that the above is applicable for the separation of target or solute molecules herein that preferably have a diffusion coefficient in the range of $5.0\times 10^{-6}$ cm$^2$/sec to $5.0\times 10^{-5}$ cm$^2$/sec. As for the mobile phase, as alluded to above, it should also be understood herein that it can be any fluid utilized in any given separation and commonly known in the prior art, to load and elute those solute molecules that are to be separated. Typical fluids may therefore include but are not limited to 1,2,4-tricholorbenzene, heptansulfonic acid sodium salt, octanesulfonic acid sodium salt, pentanesulfonic acid sodium salt monohydrate, 2,2,4-trimethylpentant, acetic acid, acetone, acetonitrile, ammonium acetate, ammonium carbonate, chlorobenzene, chloroform, cyclohexane, dimethyl sulfoxide, ether, ethyl acetate, hexanes, isobutyl alcohol, isopropyl alcohol, methanol methyl ethyl ketone, methyl isobutyl ketone, methylene chloride, methyl-tert butyl ether, N,N-dimethylacetamide, N,N-dimethylformamine, n-heptane, NMP, dichlorobenzene, pentane, petroleum ether, pyridine, tetrabutylammonium hydrogen sulfate, tetrabutylammonium hydroxide, tetrabutylammonium phosphate, tetrahydrofuran, toluene, trifluoracetic acid, water.

Figure 6:
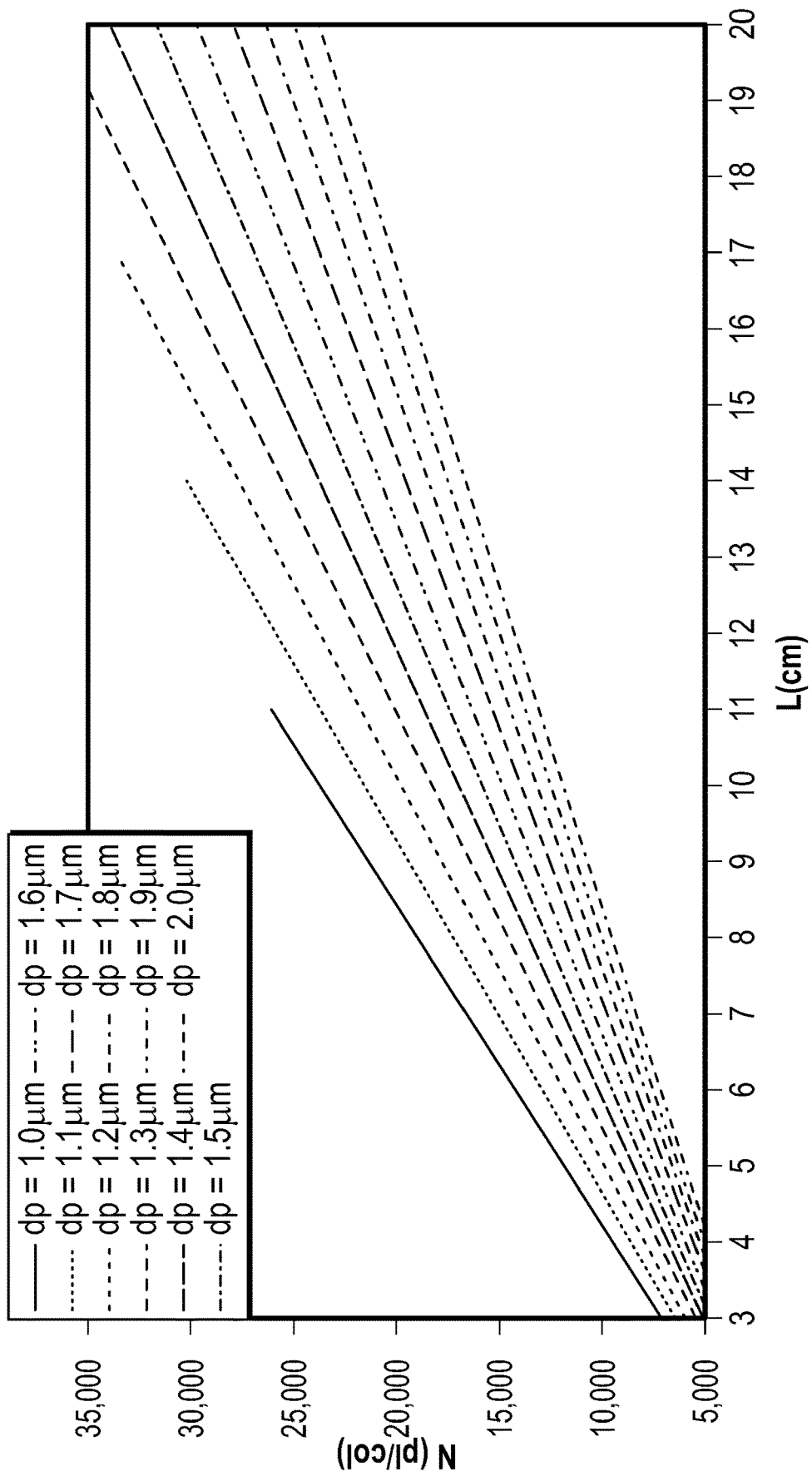
FIG. 6 provides a graphical representation of N (number of plates per column or pl/col) versus L at different values of $d_p$.

Reference is next made to Table 2 in FIG. 5 and its graphical representation in FIG. 6. As can therefore be observed, using the preferred column diameter of D=0.15 cm, FIG. 6 provides a plot of N (number of plates per column which is a measure of the amount of spreading of a solute band as it passes through the column), versus a column length of L in centimeters (cm), at $d_p$ values of 1.0 μm to 2.0 μm, where the representative mobile phase is water, although as noted above, other mobile phases may be employed. As can be seen, column length may vary between about 1 cm to 20 cm, $d_p$ or particle diameter is ≤2.0 μm, or more preferably about 1.0 μm to 2.0 μm. The value of N ranges from about 1000 to 37,000 when the value of ΔP in units of bar for such parameters is at or below a maximum of 1300 bar (see again FIGS. 3 and 4). More specifically: (1) at a particle diameter of about 1.0 μm, and a column length of about 1.0 cm to 10 cm, the value of N ranges from 2,377 to 23,773; (2) at a particle diameter of about 1.1 μm and a column length of about 1.0 cm to 13.0 cm the value of N ranges from 2,161 to 28,096; (3) at a particle diameter of about 1.2 μm and a column length of about 1.0 cm to 17.0 cm, the value of N ranges from about 1,981 to 33,679; (4) at a particle diameter of about 1.30 μm and a column length of about 1.0 cm to 20.0 cm, the value of N ranges from 1,829 to 36,574; (5) at a particle diameter of about 1.40 μm and a column length of about 1.0 cm to 20.0 cm, the value of N ranges from 1,698 to 33,968; (5) at a particle diameter of about 1.50 μm and a column length of about 1.0 cm to 20.0 cm, the value of N ranges from 1,585 to 31,698; (6) at a particle diameter of about 1.60 μm and a column length of about 1.0 cm to 20.0 cm, the value of N ranges from 1,486 to 29,716; (7) at a particle diameter of about 1.70 μm and a column length of about 1.0 cm to 20.0 cm, the value of N ranges from about 1,398 to 27,968; (8) at a particle diameter of about 1.80 μm and a column length of about 1.0 cm to 20.0 cm, the value of N ranges from 1,321 to 26,414; (9) at a particle diameter of about 1.90 μm and a column length of about 1.0 cm to 20.0 cm, the value of N ranges from about 1,251 to 25,024 and (10) at a particle diameter of about 2.0 μm and a column length of about 1.0 cm to 20.0 cm, the value of N ranges from about 1,189 to 23,774.

Figure 8:
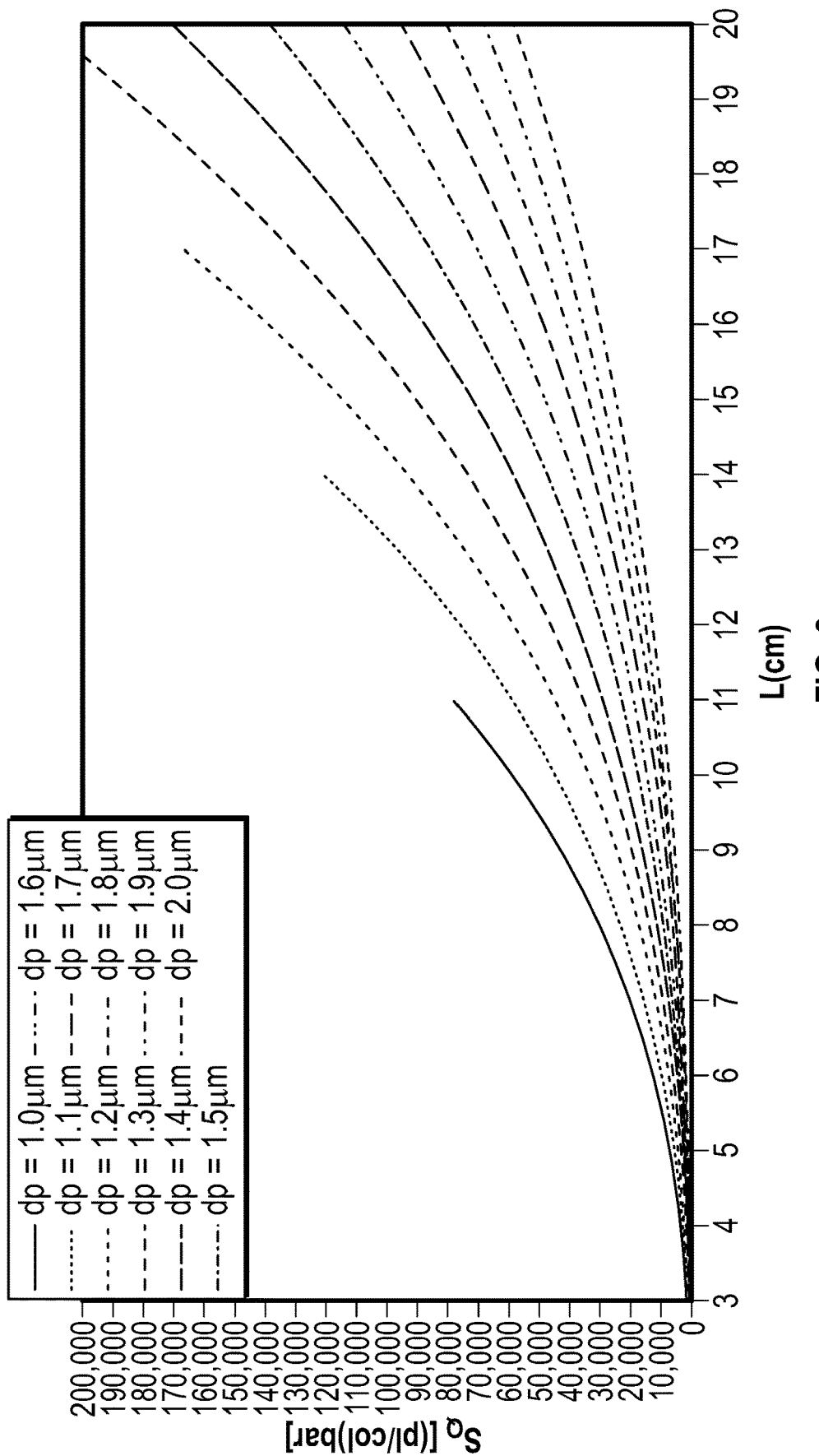
FIG. 8 provides a graphical representation of $S_Q$ (number of plates per column bar) versus L at different values of $d_p$.

Reference is next made to Table 3 in FIG. 7 and its graphical representation in FIG. 8. As can therefore be observed, using the preferred column diameter of D=0.15 cm, FIG. 8 provides a plot of $S_Q$ (number of plates per column bar) versus a column length of L in centimeters (cm), at $d_p$ values of about 1.0 μm to 2.0 μm, where the representative mobile phase is water, although as noted, other mobile phases may be employed. As can be seen, column length may vary between about 1 cm to 20 cm, $d_p$ or particle diameter is ≤2.0 μm, or more preferably about 1.0 μm to 2.0 μm and the value of ranges 7 to 212,192 when the value of ΔP in units of bar for such parameters is at or below a maximum of 1300 bar (see again FIGS. 3 and 4). More specifically: (1) at a particle diameter of about 1.0 μm, and a column length of about 1.0 cm to 10 cm, the value of $S_Q$ ranges from 58 to 58,272; (2) at a particle diameter of about 1.1 μm and a column length of about 1.0 cm to 13.0 cm the value of $S_Q$ ranges from 44 to 96,187; (3) at a particle diameter of about 1.2 μm and a column length of about 1.0 cm to 17.0 cm, the value of $S_Q$ ranges from 34 to 165,676; (4) at a particle diameter of about 1.30 μm and a column length of about 1.0 cm to 20.0 cm, the value of $S_Q$ ranges from 27 to 212,192; (5) at a particle diameter of about 1.40 μm and a column length of about 1.0 cm to 20.0 cm, the value of $S_Q$ ranges from 21 to 169,888; (5) at a particle diameter of about 1.50 μm and a column length of about 1.0 cm to 20.0 cm, the value of $S_Q$ ranges from about 17 to 138,128; (6) at a particle diameter of about 1.60 μm and a column length of about 1.0 cm to 20.0 cm, the value of $S_Q$ ranges from 14 to 113,816; (7) at a particle diameter of about 1.70 μm and a column length of about 1.0 cm to 20.0 cm, the value of $S_Q$ ranges from 12 to 94,888; (8) at a particle diameter of about 1.80 μm and a column length of about 1.0 cm to 20.0 cm, the value of $S_Q$ ranges from about 10 to 79,934; (9) at a particle diameter of about 1.90 μm and a column length of about 1.0 cm to 20.0 cm, the value of $S_Q$ ranges from 8 to 67,966 and (10) at a particle diameter of about 2.0 μm and a column length of 1.0 cm to 20.0 cm, the value of $S_Q$ ranges from 7 to 58,272.

Figure 10:
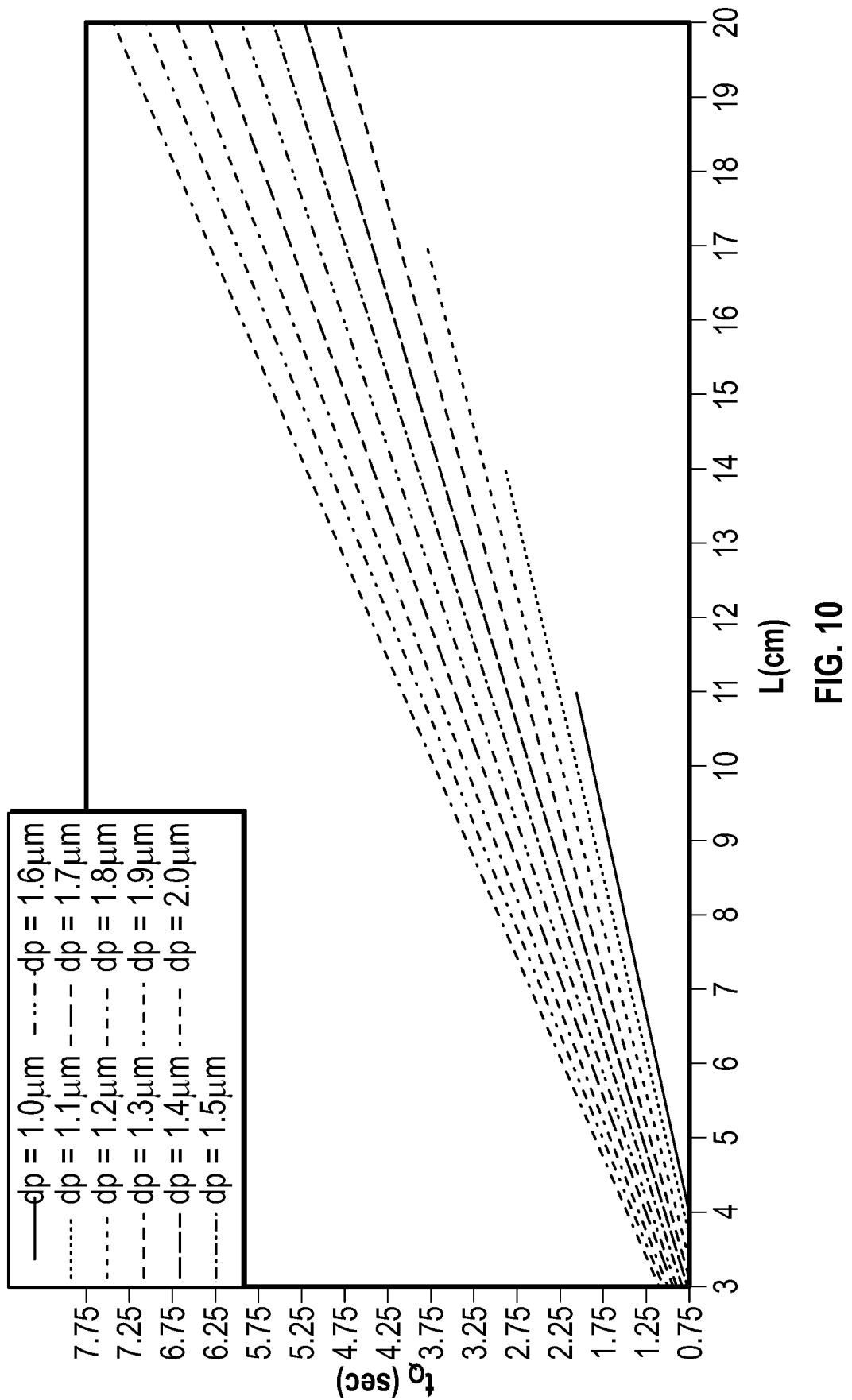
FIG. 10 provides a graphical representation of $t_Q$ vs L at different values of $d_p$.

Reference is next made to Table 4 in FIG. 9 and its graphical representation in FIG. 10. As can therefore be observed, using the preferred column diameter of D=0.15 cm, FIG. 6 provides a plot of $t_Q$ versus column length of L in centimeters (cm), at $d_p$ values of 1.0 μm to 2.0 μm, where the representative mobile phase is water, although as noted, other mobile phases may be employed. As can be seen, column length may vary between 1 cm to 20 cm, $d_p$ or particle diameter is ≤2.0 μm, or more preferably about 1.0 μm to 2.0 μm and the value of $t_Q$ ranges from 0.19 to 7.44 when the value of ΔP in units of bar for such parameters is at or below a maximum of 1300 bar (see again Table 1 and FIG. 3). More specifically: (1) at a particle diameter of about 1.0 μm and a column length of about 1.0 cm to 10 cm, the value of $t_Q$ ranges from 0.19 to 1.86; (2) at a particle diameter of about 1.1 μm and a column length of about 1.0 cm to 13.0 cm the value of $t_Q$ ranges from 0.20 to 2.66; (3) at a particle diameter of about 1.2 μm and a column length of about 1.0 cm to 17.0 cm, the value of $t_Q$ ranges from 0.22 to 3.79; (4) at a particle diameter of about 1.30 μm and a column length of about 1.0 cm to 20.0 cm, the value of $t_Q$ ranges from 0.24 to 4.84; (5) at a particle diameter of about 1.40 μm and a column length of about 1.0 cm to 20.0 cm, the value of $t_Q$ ranges from 0.26 to 5.21; (5) at a particle diameter of about 1.50 μm and a column length of about 1.0 cm to 20.0 cm, the value of $t_Q$ ranges from 0.28 to 5.58; (6) at a particle diameter of about 1.60 μm and a column length of 1.0 cm to 20.0 cm, the value of $t_Q$ ranges from about 0.30 to 5.95; (7) at a particle diameter of about 1.70 μm and a column length of about 1.0 cm to 20.0 cm, the value of $t_Q$ ranges from 0.32 to 6.32; (8) at a particle diameter of about 1.80 μm and a column length of 1.0 cm to 20.0 cm, the value of $t_Q$ ranges from 0.33 to 6.70; (9) at a particle diameter of about 1.90 μm and a column length of about 1.0 cm to 20.0 cm, the value of $t_Q$ ranges from 0.35 to 7.07 and (10) at a particle diameter of about 2.0 μm and a column length of about 1.0 cm to 20.0 cm, the value of $t_Q$ ranges from 0.37 to 7.44.

Reference is next made to Table 5 below and the graphical presentation in FIG. 11.

TABLE 5

| x = $d_p$ (μm) | y = (Q mL/min) |
| --- | --- |
| 0.75 | 0.134 |
| 1.00 | 0.101 |
| 1.10 | 0.092 |
| 1.20 | 0.084 |
| 1.30 | 0.077 |
| 1.40 | 0.072 |
| 1.50 | 0.067 |
| 1.60 | 0.063 |
| 1.70 | 0.059 |
| 1.80 | 0.056 |
| 1.90 | 0.053 |
| 2.00 | 0.050 |
| 2.25 | 0.045 |

Figure 11:
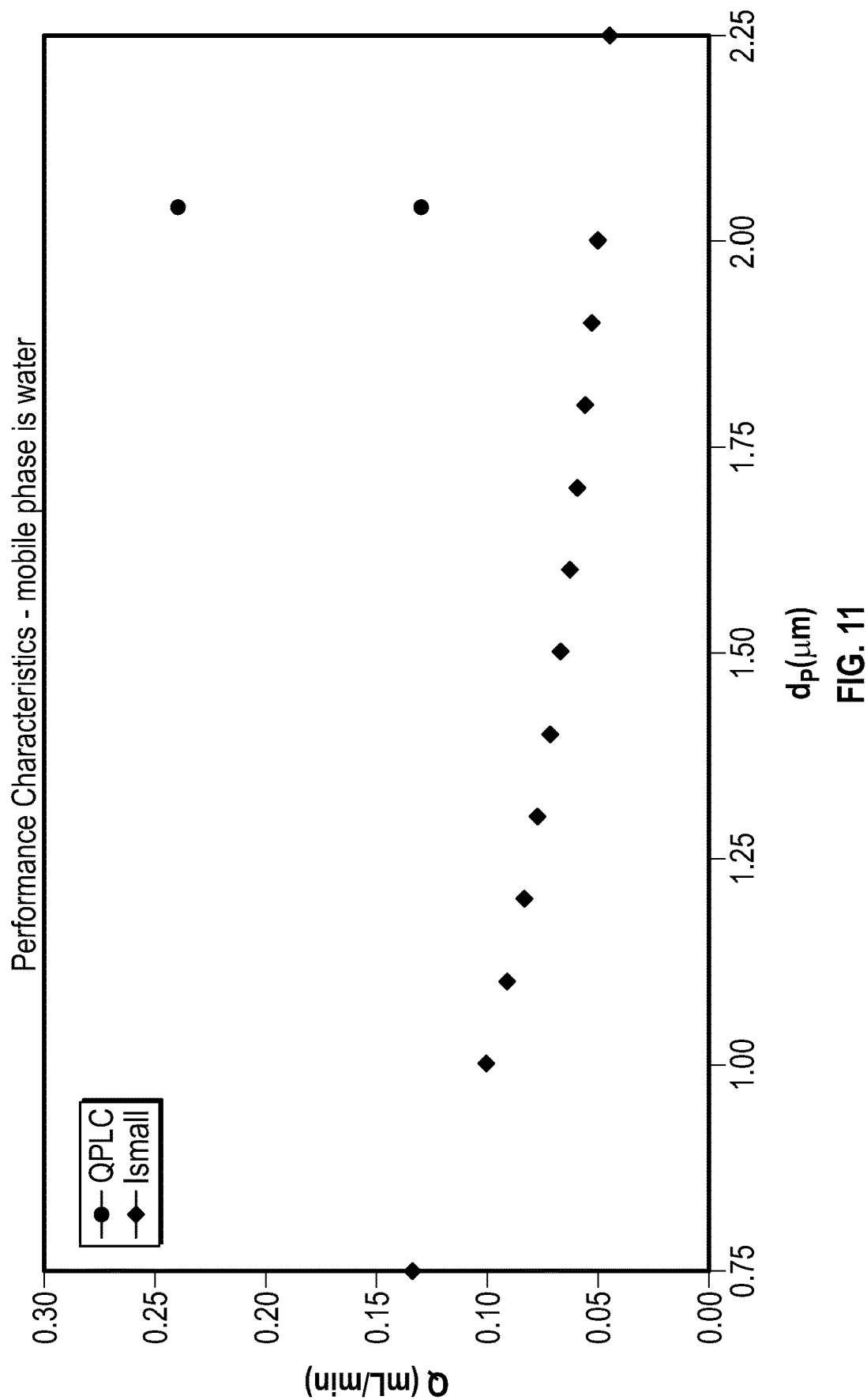
FIG. 11 provides a graphical representation of volumetric flow rate Q in ml/min versus $d_p$.

As can be seen from Table 5 and FIG. 11, using a column of D=0.15 cm, a plot of volumetric flow rate Q in units of mL/min, versus particle diameter $d_p$ in units of micron is provided. This identifies the available volumetric flow rates that may be achieved in the columns identified herein commensurate with the selection of a maximum value of ΔP as 1300 bar (20,000 psi approx.) and a maximum column length of about 1.0 cm to 20 cm, containing a range of particle diameters from about 1.0 micron to 2 microns, as applied to solutes in an exemplary mobile phase of water. It is worth noting that the solutes herein are preferably those molecules that have a diffusion coefficient in the range of $5.0 \times 10^{-6}$ cm$^2$/sec to $5.0 \times 10^{-5}$ cm$^2$/sec.

As can also be observed in FIG. 11, the volumetric flow rate for particle sizes herein of about 1.0 to 2.0 microns ranges from 0.10 ml/min to 0.05 ml/min in columns having lengths in the range of about 1 cm to 20 cm. For comparison, a data point for each particle size shown in Table 5 is graphed in FIG. 11 and identified as QPLC data points and compared to two data points from the paper by Ismail et al, Journal of Chromatography A, 1454 (2016), 86-92. In Table 1 in the Ismail paper, the results are reported for a particle size of 2.04 μm packed into 6 different column dimensions, i.e., (L=10 and D=0.3 cm), (L=7.5 and D=0.3 cm), (L=5 and D=0.3 cm), (L=10 and D=0.21 cm), (L=7.5 and D=0.21 cm), (L=5 and D=0.21 cm). The permeability data reported for the 6 columns dictates a range of flow rates between 0.13 and 0.24 mL/min which are the data points identified for the Ismail paper in FIG. 11. By contrast, as recited herein, at a particle size of about 2.0 μm, the flow is 0.05 mL/min, and at a particle size of about 1.0 μm, the flow is 0.10 mL/min.

As noted, the conduit or column herein has a preferred diameter of about 0.15 cm to about 0.20 cm and may be a hollow, tubular container, formed of a material such as stainless steel or plastic or other metallic composition, that is chemically inert or unreactive to the eluting fluids. Preferably, such column is formed herein by packing particles having the identified preferred particle size of about 1.0 to 2.0 microns and preferably under pressure of at least about 20,000 psi. This will generally ensure that the column formed will, as noted above, have an even distribution of particles and the interstitial voids are uniform and reduced to a minimum, and will typically withstand operation up to a pressure drop of 20,000 psi without bed collapse or rearrangement.

It can now be appreciated that the present disclosure provides a protocol for the selection and design of columns for liquid chromatography, which improves and maximizes column performance between the two opposing extremes of a desired maximum separation efficiency and a reduction and minimization of analysis time.

What is claimed is:

1. A method performed in a liquid chromatography apparatus comprising:
   providing a packed column containing particles having a diameter of about 1.0 μm to 2.0 μm, said column having an internal diameter of about 0.15 cm to 0.20 cm and a column length of about 1 cm to 20 cm;
   eluting a fluid through said column at a volumetric flow rate of 0.10 ml/min to 0.05 ml/min with a solute having a diffusion coefficient in the range of $5.0 \times 10^{-6}$ cm$^2$/sec to $5.0 \times 10^{-5}$ cm$^2$/sec wherein said column indicates a maximum pressure drop of 1300 bar.

2. The method of claim 1 wherein said particles have a diameter of about 1.0 μm and said column has a length of about 1 cm to 10 cm.

3. The method of claim 1 wherein said particles have a diameter of about 1.1 μm and said column has a length of about 1 cm to 13 cm.

4. The method of claim 1 wherein said particles have a diameter of about 1.2 μm and said column has a length of about 1 cm to 17 cm.

5. The method of claim 1 wherein said particles have a diameter of about 1.3 μm and said column has a length of about 1.0 cm to 20 cm.

6. The method of claim 1 wherein said particles have a diameter of about 1.4 μm and said column has a length of about 1.0 cm to 20 cm.

7. The method of claim 1 wherein said particles have a diameter of about 1.5 μm and said column has a length of about 1.0 cm to 20 cm.

8. The method of claim 1 wherein said particles have a diameter of about 1.6 μm and said column has a length of about 1.0 cm to 20 cm.

9. The method of claim 1 wherein said particles have a diameter of about 1.7 μm and said column has a length of about 1.0 cm to 20 cm.

10. The method of claim 1 wherein said particles have a diameter of about 1.8 μm and said column has a length of about 1.0 cm to 20 cm.

11. The method of claim 1 wherein said particles have a diameter of about 1.9 μm and said column has a length of about 1.0 cm to 20 cm.

12. The method of claim 1 wherein said particles have a diameter of about 2.0 μm and said column has a length of about 1.0 cm to 20 cm.

13. The method of claim 1 wherein the number of plates per column (N) is in the range of 1000 to 37,000.

14. The method of claim 1 wherein the number of plates per column bar ($S_Q$) is in the range of 7 to 221,192.

15. A method for isolating a target molecule comprising:
   providing a packed column containing particles having a diameter of about 1.0 μm to 2.0 μm, said column having an internal diameter of about 0.15 cm to 0.20 cm and a column length of about 1 cm to 20 cm;
   eluting a fluid through said column comprising the target molecule at a volumetric flow rate of 0.10 ml/min to 0.05 ml/min wherein the target molecule has a diffusion coefficient in the range of $5.0 \times 10^{-6}$ cm$^2$/sec to $5.0 \times 10^{-5}$ cm$^2$/sec wherein said column indicates a maximum pressure drop of 1300 bar; and
   recovering portions of said liquid comprising the target molecule.

* * * * *